United States Patent
Singla et al.

(10) Patent No.: US 7,231,475 B1
(45) Date of Patent: Jun. 12, 2007

(54) ADVANCED BANDWIDTH ALLOCATION IN PCI BUS ARCHITECTURE

(75) Inventors: Ankur Singla, San Jose, CA (US); Harshad Nakil, San Jose, CA (US); Rajashekar Reddy, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 537 days.

(21) Appl. No.: 10/768,924

(22) Filed: Jan. 30, 2004

(51) Int. Cl.
*G06F 13/362* (2006.01)

(52) U.S. Cl. .................................................... 710/117

(58) Field of Classification Search .............. 710/117, 710/124; 370/395.21
See application file for complete search history.

(56) References Cited

U.S. PATENT DOCUMENTS

| | | | | |
|---|---|---|---|---|
| 5,241,632 A | * | 8/1993 | O'Connell et al. | 710/117 |
| 5,383,190 A | * | 1/1995 | Janssen et al. | 370/440 |
| 5,572,517 A | * | 11/1996 | Safadi | 370/431 |
| 5,577,197 A | * | 11/1996 | Beck | 714/26 |
| 5,778,200 A | * | 7/1998 | Gulick | 710/113 |
| 5,787,568 A | * | 8/1998 | Crowell | 29/596 |
| 5,914,934 A | * | 6/1999 | Rathnavelu | 370/229 |
| 6,076,125 A | * | 6/2000 | Anand | 710/107 |
| 6,088,751 A | * | 7/2000 | Jaramillo | 710/116 |
| 6,157,978 A | * | 12/2000 | Ng et al. | 710/240 |
| 6,272,580 B1 | * | 8/2001 | Stevens et al. | 710/116 |
| 6,320,846 B1 | * | 11/2001 | Jamp et al. | 370/235 |
| 6,823,140 B1 | * | 11/2004 | Davidson | 398/73 |
| 6,940,824 B2 | * | 9/2005 | Shibutani | 370/252 |
| 7,054,968 B2 | * | 5/2006 | Shrader et al. | 710/105 |
| 7,054,969 B1 | * | 5/2006 | Phelps et al. | 710/113 |
| 2004/0064678 A1 | * | 4/2004 | Black et al. | 712/214 |
| 2005/0135396 A1 | * | 6/2005 | McDaniel et al. | 370/412 |

FOREIGN PATENT DOCUMENTS

EP           755137 A1 *    1/1997

OTHER PUBLICATIONS

HT.book, Chapter 5: Flow Control, pp. 99-117, downloaded from the Internet: <http://www.awprofessional.com/content/images/0321168453/samplechapter/mindsharech05.pdf>.

* cited by examiner

*Primary Examiner*—Paul R. Myers
(74) *Attorney, Agent, or Firm*—Charles E. Krueger

(57) ABSTRACT

A bus arbitration system and method allocates total bus bandwidth between latency sensitive and latency insensitive interfaces by utilizing windows to divide the total bandwidth into latency sensitive and latency insensitive portions. Each interface is initially allocated top-up numbers of latency sensitive and latency insensitive tokens to proportionally allocate bus accesses between the interfaces according to their requirements. For an interface having access to the bus, the number of tokens is decremented for each successful bus transfer.

25 Claims, 3 Drawing Sheets

ADVANCED BANDWIDTH ALLOCATION IN PCI BUS ARCHITECTURE

BACKGROUND OF THE INVENTION

PCI Bus Specification allows for arbitration among connected devices to allocate access to the shared system bus resources. Typically, arbiters provide requesting devices access to the shared PCI bus and use some form of Round Robin or Weighted Round Robin algorithms.

In a weighted round-robin scheme, for any given connection between a master and slave, the amount of access each master has to a given slave can be selected.

In a fairness-based arbitration scheme, each master-slave pair has an integer value of "shares" for bus transfers. If conflicting requests to access a particular slave occur, the master that has the highest fairness setting is granted access to the slave. After the master-slave pair exhausts its share assignment, control of the slave is granted to the master-slave pairs with lower share assignments. A fairness based arbitration scheme tries to prevent starvation.

For example, if master A, a DMA controller, has 1 share of access to a RAM slave port and master B, the a processor, has 2 shares of access to the same RAM slave port, the DMA controller can access the slave 33% of the time (assuming both masters continually request transfers to the shared slave). The arbitration settings do not have to be sequential values. For example, an arbitration setting of 9 for one master, and 1 for another allots 90% and 10% access, respectively.

These allocation methods monitor and use the arbitration signals specified in the PCI specification, REQ#, FRAME#, IRDY#, which indicate the beginning and end of a bus transaction.

The standard Round Robin technique does not dynamically allocate access to the bus to take into account the different bandwidth requirements of devices that are latency sensitive and devices with high traffic flows. For example, a device implementing isochronous traffic, such as voice over IP (VoIP) requires low-latency access to the bus to maintain voice quality. However, this device does may not be a high traffic device so it doesn't need to consume much of the total bus bandwidth. On the other hand, a high traffic device, such as a PCI bridge is not as latency sensitive but needs to be allocated more bus bandwidth. Compounding the problem is the unpredictable nature of bus access requests which makes static systems inefficient. In a round robin system low-latency devices may be kept off the bus for too long and high-traffic devices may not be allocated enough bus cycles. For example, in the round robin example described above, the bandwidth is allocated statically between the two devices but there is not provision for low-latency access.

Accordingly, new bus arbitration techniques are required to dynamically balance the conflicting needs of high traffic devices and low latency devices.

BRIEF SUMMARY OF THE INVENTION

In a first embodiment of the invention, the bandwidth of a shared bus is dynamically allocated between devices to account for both the latency sensitivity and traffic requirements of each interface coupled to the shared bus.

In another embodiment of the invention, two different windows programmably divide the arbitration cycles into latency sensitive and latency insensitive cycles to allocate bus bandwidth between latency sensitive and latency insensitive interfaces.

In another embodiment of the invention, each interface is assigned latency sensitive and latency insensitive token numbers in proportion to the bandwidth to be allocated to the interface.

In another embodiment of the invention, the token allocation of an interface granted to the bus is adjusted for every successful data transfer on the bus.

In another embodiment of the invention, the device is re-assigned the initial programmed token allocations when all devices requesting access to the bus during an arbitration cycle have no tokens available.

In another embodiment of the invention, the device are re-assigned the initial programmed token allocations when all devices have no tokens available.

In another embodiment of the invention, an interface that won a previous arbitration may not be granted the bus in a following arbitration cycle.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

A first embodiment of the invention is a PCI Arbitration system that provides fine granularity bandwidth allocation for both Latency Sensitive and Insensitive transactions and uses most of the PCI Bus signals to achieve this granularity. By observing transactions/burst widths and addresses on AD bus (qualifying with the DEVSEL#, TRDY#, IRDY#, and STOP# PCI signals) and software programmed address windows within the circuitry, the arbitration module deducts tokens from each device state vector. The PCI bus arbitration algorithm module is responsible for correctly deciding which device receives the grant (i.e. access to the PCI bus) in response to the current state vector of all the requestors.

As is known in the art, some devices have multiple interfaces connected to the bus and this case each interface has an associated status vector which holds token values. In the following if a device has only one interface the term device will be used interchangeably with the term interface.

Upon reset, each interface status vector is loaded with software programmed values for the two kinds of accesses—Latency Sensitive and Latency Insensitive. When normalized, these programmed values signify the overall bandwidth for both latency sensitive accesses and insensitive accesses that each interface is guaranteed within a window of requested time.

Figures 1, 2A, 2B:
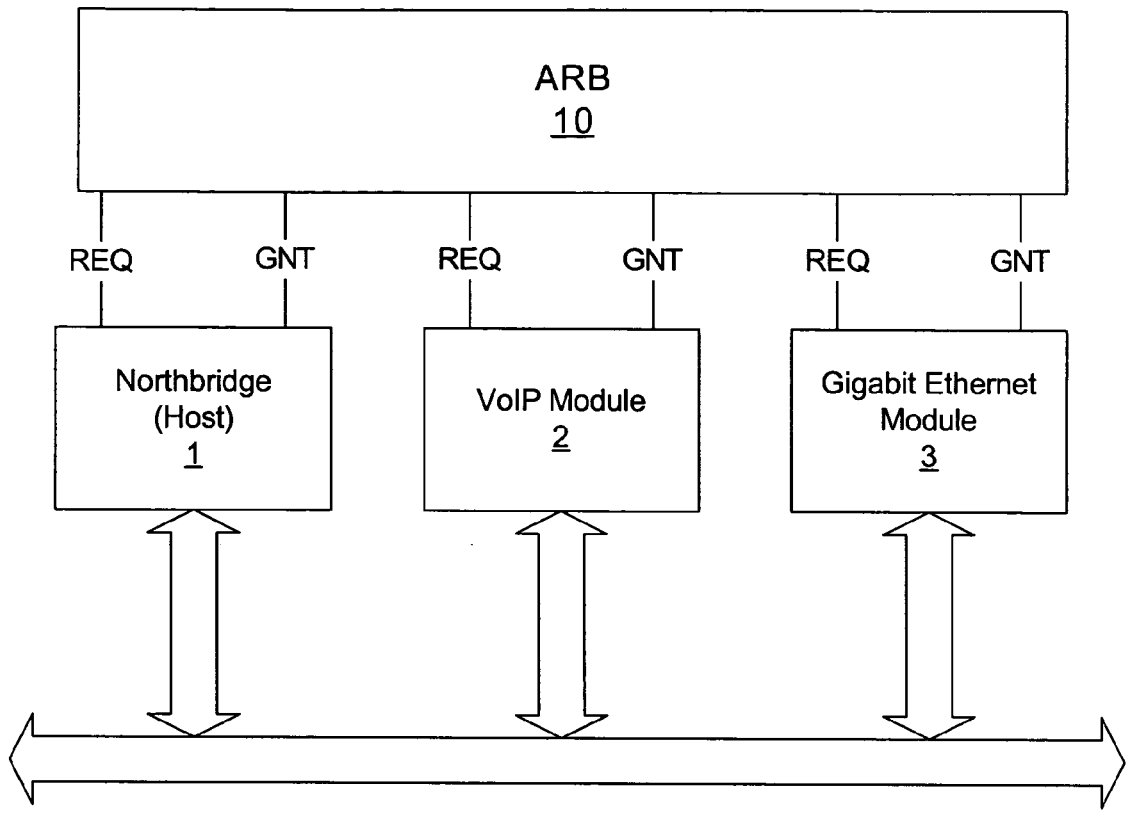
FIG. 1 is a block diagram of an exemplary PCI bus system.
FIGS. 2A and B depict the an example of the allotment of LS and LI tokens in an example illustrating the operation of an embodiment of the invention.

The embodiment will now be described in greater detail with reference to the exemplary system depicted in FIG. 1. In FIG. 1 an Host 1, VoIP Module 2, and Gigabit Ethernet (GE) module 3 are connected to a common bus and must share access to the bus. Each device is also connected to an Arbiter (ARB) 10 by its own request (REQ) and grant (GNT) lines. When a device needs to access the bus it asserts a signal on its REQ line. The ARB 10 asserts the GNT line of the device that wins the arbitration to grant the device access to the bus.

In this embodiment each device has a status vector that holds two types of tokens, latency sensitive (LS) tokens and latency insensitive (LI) tokens. As will be described below, the number of these tokens assigned to each device is utilized to dynamically allocate bandwidth to take into account latency sensitivity and high traffic requirements.

The Arbitration algorithm circuitry has two resource access windows—a Latency Sensitive window and Regular Access (Latency Insensitive) window. Using the Latency Sensitive window, the arbiter is able to provide access guarantees to latency sensitive devices. The Latency Sensitive window is an allocation of the total PCI bus bandwidth for latency sensitive devices/accesses and is programmable by software as a percentage of all transactions and/or available bandwidth of the PCI bus. The rest of the available bandwidth is allocated to the latency insensitive traffic. Such allocation of bandwidth to latency sensitive interfaces also prevents an interface from being starved for prolonged periods of time when a high bandwidth/throughput interface that has been programmed with a much higher throughput requirement is accessing the shared bus.

In the system depicted in FIG. 1, the Host 1 has low latency sensitivity and a high traffic rate, the VoIP module 2 has high latency sensitivity and a low traffic rate, and the GE module 3 has medium latency sensitivity and a medium traffic rate. These characteristics are reflected in the number of tokens held in the LS and LI buckets of each device as depicted in FIGS. 2A and 2B.

In FIG. 2A the tokens are distributed in the LI buckets of the devices so that for LI arbitrations the Host 1 wins $\frac{1}{5}$ of the time, the VoIP module wins the arbitration $\frac{1}{20}$ of the time, and the GE module 3 wins the arbitration $\frac{1}{10}$ of the time. Thus, the latency insensitive bandwidth of the bus is fairly allocated between the devices based on their traffic rates.

In FIG. 2B the tokens are distributed in the LS buckets of the devices so that for LS arbitrations the Host 1 never wins the arbitration and the VoIP module 2 wins the arbitration five times as often as the GE module 3. In this case, the latency sensitive bandwidth is fairly allocated during LS accesses based on the latency sensitivity of each device.

Figure 3:
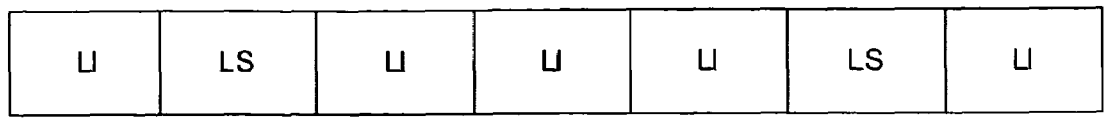
FIG. 3 is a schematic diagram depicting the occurrence of LS and LI windows.

FIG. 3 depicts the bus window frequency for a case where the LS device, in this example the VoIP module, must be able to access the bus every four bus cycles. The tokens in the LS bucket determine the winner of the arbitration so, in this example, the VoIP module 2 will win the arbitration during LS windows most of the time and is thus assured of having access to the bus about every four cycles.

In this example, 80% of the total bus bandwidth is allocated to latency insensitive transactions to assure adequate bandwidth for high traffic devices. Thus, during the LI windows the high traffic devices, in this example the Host 1 and GE module 2, win most of the arbitrations so that most of the overall bandwidth of the bus is allocated to these devices.

The concept of a window of requested time is important in highly dynamic systems like the PCI bus because the requests are highly unpredictable and aperiodic. As a result, if an interface is not requesting service it is not allowed to skew the bandwidth allocation till it requests for service.

The above description presents a static picture of the allocation scheme. However, in this embodiment the number of tokens held by a device is dynamically changed based on the number of successful data transfers on the bus. Once the device status vectors are loaded with their programmed top-up values (different for each interface), every time a new grant value is generated the PCI device that wins the arbitration sees its allocation in the status vector reduce by 1 for every successful 32-bit word transaction on the bus.

As is known in the art, the number of successful data transfers on the bus can be determined by observing transactions/burst widths on the PCI address bus. These transactions are qualified by the DEVESEL#, TRDY#, IRDY#, and STOP# signals so these signals must also be monitored by the ARB 10. Upon initialization, and at other times as described more fully below, the device status vectors are loaded with their programmed top-up values (different for each interface) and, every time a new grant value is generated, the PCI device that wins the arbitration sees its allocation of tokens in the status vector reduce by 1 for every successful 32-bit word transaction on the bus.

Figure 4:
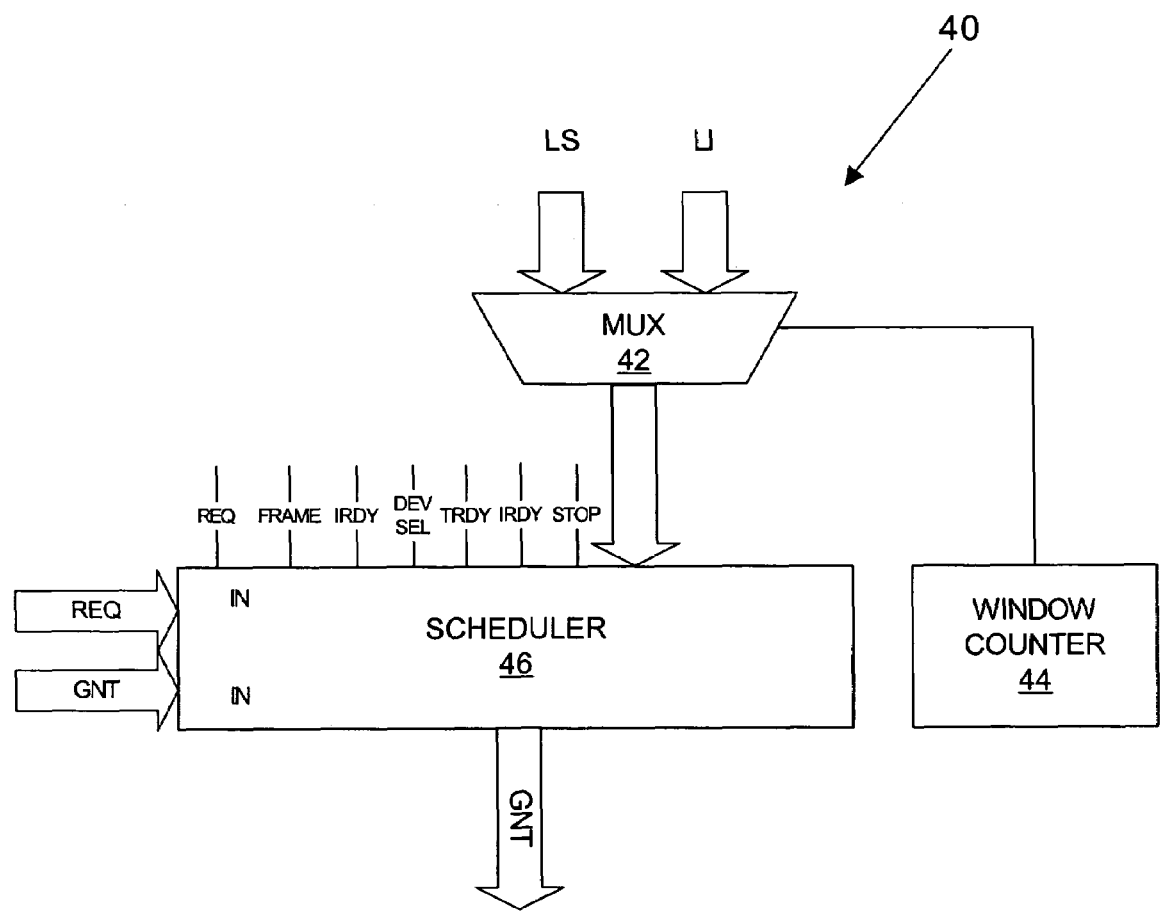
FIG. 4 is a block diagram of the Comparator and Highest Index Generator of an embodiment of the invention.

FIG. 4 is a high level diagram of logic for implementing a Comparator and Highest Index Generator 40 in an embodiment of the invention. The Comparator and Highest Index generator 40 is a special comparator that determines the winner based on the device status vector values of current requestors, current bus window type, and the current grant holder.

In FIG. 4 a multiplexer (MUX) 42 receives as inputs both the LS and LI token values from all devices requesting access to the bus during a next arbitration cycle. A WINDOW COUNTER 44 has its output coupled to the control input of the MUX 42. The output of the MUX is coupled to the token inputs of the SCHEDULER 46. The SCHEDULER 46 is coupled to receive the current GNT signal indicating the device that won the current grant cycle and REQ signals of devices requesting access during the next arbitration cycle. The SCHEDULER 46 is also coupled to monitor the REQ#, FRAME#, IRDY#, DEVESEL#, TRDY#, IRDY#, and STOP# PCI signals and also has a GNT output for generating the GNT signal indicating the device that wins the arbitration and will have access to the bus during the next arbitration cycle.

Figure 5:
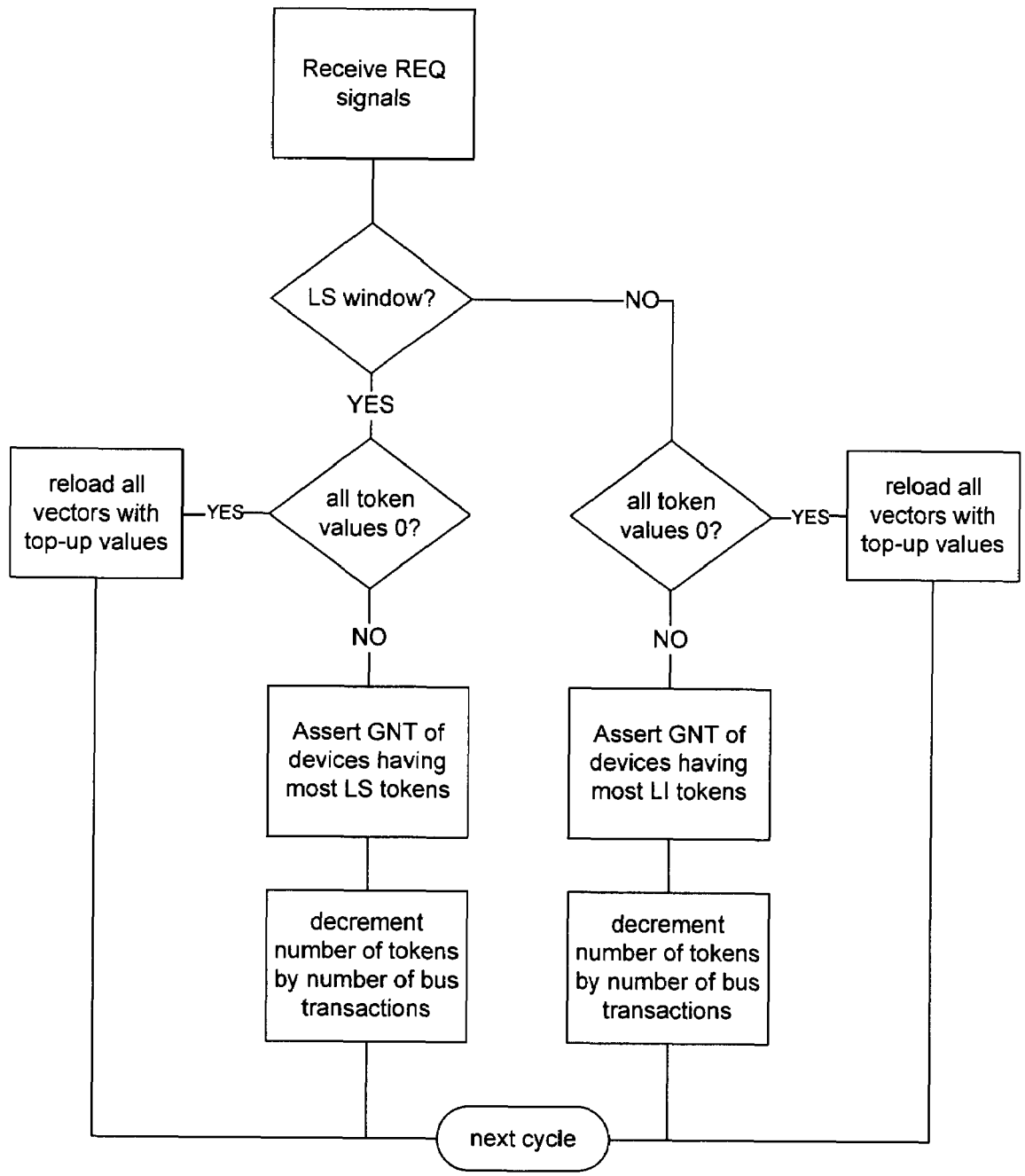
FIG. 5 is a flow chart depicting the steps performed by an embodiment of the invention.

The function of this embodiment will now be described with reference to FIG. 4 and the flow chart of FIG. 5. At the start of the arbitration cycle the SCHEDULER 46 will evaluate the number of tokens in each device requesting access to the bus. Both LS and LI token numbers of each requesting devices will be received at the MUX inputs. The output signal from the WINDOW COUNTER 44 determines the type of window for the current arbitration cycle. For example, if the frequency of LS windows were to 1:4 then a value of 4 is loaded into the WINDOW COUNTER 44 so that it counts modulo 4. The count is incremented for each arbitration cycle and the WINDOW COUNTER out signal is asserted each time the count is equal to zero. The MUX 42 selects the type of token numbers depending on the type of window indicated by the WINDOW COUNTER.

In this embodiment, the SCHEDULER 46 then determines if the token values for all the requesting devices are zero. If so, then the token values of all device vectors are renormalized to the original top-up values and the cycle is started again. If not, then the SCHEDULER 46 grants the bus to the device having the most tokens.

During the arbitration cycle the token number for the winning device is adjusted for each successful word transfer on the bus. These transfers are counted by monitoring the PCI signals indicated on FIG. 4. The SCHEDULER 46 is then ready to begin the next arbitration cycle.

Due to the non-deterministic nature of the bus requests, the decrementing of the token values of arbitration winning devices will change the token ratios from the initialized programmed values which allocated bandwidth according to the device requirements. Accordingly, from time to time these values are renormalized to maintain the desired bandwidth allocation. In the embodiment described with reference to FIG. 5, if all the current requestors have their token buckets empty then all the vectors are reloaded with the programmed top-up values.

If all the current requestors have zero token count values then these are the requestors that have had the most access to the bus and have had their token count values decremented. Since these devices have had the most access to the bus it is probable that they were programmed with the highest token count values and have the highest bandwidth requirement. However, in the future these devices will loose out to devices having lower bandwidth requirements because their tokens have been exhausted. By renormalizing at this point is assured that the programmed access values will be followed in succeeding bus arbitration cycles.

This scheme allows for fair bandwidth allocation in the future as it is difficult to predict the future distribution of requests. Since the determination of reloading the counters is made using the current requestors when another calculation is requested, it gives a chance to the devices who have tokens but have not requested the allocation of the bandwidth till now. In case, they miss this window, they are only guaranteed future allocation to be fair in accordance with the programmed bandwidth.

In this embodiment, if all the interfaces have their token buckets empty then all the vectors are reloaded with the programmed top-up values. The token buckets can also be reloaded when a fixed time interval times out.

In one embodiment, the current grant holder is not given the access to bus again if other requestors have not been given some access to the bus for the particular window type (delay sensitive, or regular access) but have tokens in their status vectors. This prevents line-blocking by a very high bandwidth device.

The invention may be implemented as program code, stored on a computer readable medium, that is executed by a digital computer. For example, all the functions performed by the hardware depicted in FIG. 4 can also be implemented in software. The computer readable medium may include, among other things, magnetic media, optical media, electromagnetic fields encoding digital information, and so on.

The invention has now been described with reference to the preferred embodiments. For example, the above-described embodiments utilize the PCI bus protocol. However, the invention can be utilized with other bus protocols that include arbitration to control access to the bus. Alternatives and substitutions will now be apparent to persons of skill in the art. Accordingly, it is not intended to limit the invention except as provided by the appended claims.

What is claimed is:

1. A method comprising:
    assigning a top-up of number of latency sensitive (LS) tokens associated with each requestor, with the number of LS tokens indicating the LS bandwidth of the bus allocated to an associated requestor;
    assigning a top-up of number of latency insensitive (LI) tokens associated with each requestor, with the number of LI tokens indicating the LI bandwidth of the bus allocated to an associated requestor;
    setting the widths of alternately occurring LS and LI resource access windows with the width of the LI resource access window not greater than a required LS time interval where the width of the LS resource access window is an allocation of total bus bandwidth to LS accesses and the remaining bus bandwidth is allocated to LI accesses;
    applying either an LS resource access window or an LI resource access window to a current arbitration cycle;
    granting access to a requestor having the most LS tokens when a number of requestors request access to the bus during a current arbitration cycle in the LS resource access window and decrementing the number of LS tokens assigned to a winning requestor granted access to the bus in proportion to the number of successful bus data transactions completed during the current arbitration cycle; and
    granting access to a requestor having the most LI tokens when a number of requestors request access to the bus during a current arbitration cycle in the LI resource access window and decrementing the number of LI tokens assigned to a winning requestor granted access to the bus in proportion to the number of successful bus data transactions completed during the current arbitration cycle.

2. The method of claim 1 further comprising the steps of:
    reloading all LS and LI token values of devices to the top-up values if the token numbers assigned to all the devices equal zero.

3. The method of claim 1 further comprising the steps of:
    reloading all LS and LI token values of devices to the top-up numbers if the token numbers assigned to all the requestors requesting access to the bus during a current arbitration cycle equal zero.

4. The method of claim 1 further comprising the step of:
    reloading all LS and LI token values of devices to the top-up numbers if a set time interval expires.

5. The method of claim 1 where the step of setting the time interval widths comprises the step of:
    setting a counter with an LI interval value to indicate a frequency of latency cycles determined by the LI interval value.

6. The method of claim 1 further comprising the step of:
    not granting the bus to a particular requestor during a current arbitration cycle if the particular requestor won an immediately preceding arbitration cycle.

7. The method of claim 1 further comprising the step of:
monitoring bus protocol timing signals to determine the number of successful bus data transactions completed during the current arbitration cycle.

8. A system comprising:

a programmable window signal generator that outputs a window control signal indicating whether a current access window is a latency sensitive (LS) or latency insensitive (LI) access window with the duration of an LS interval between occurrences of the successive LS access windows being programmable;

a selector block that receives a number of LS tokens and LI tokens, associated with each requesting device requesting access to the bus during a current arbitration cycle, at first and second input ports respectively, a control input coupled to the programmable window signal generator to receive the window control signal, and an output coupled to the first input port during an LS window and to the second input port during an LI window; and an arbiter block, coupled to the output port of the selector block, that grants access to the bus to a requesting device having the most tokens and that decrements the number of tokens assigned to a winning device granted access to the bus in proportion to the number of successful bus data transactions completed during the current arbitration cycle.

9. The system of claim 8 where the programmable window signal generator comprises:

a programmable counter that counts arbitration cycles and indicates an LS cycle at a fixed programmable interval.

10. The system of claim 9 where the arbiter block is coupled to receive bus timing signals and monitors the signals to determine the number of successful bus data transactions completed during the current arbitration cycle.

11. The system of claim 8 where the arbiter block receives the grant signal from an immediately preceding arbitration cycle and does not grant the bus to a winner of the previous arbitration cycle.

12. A system comprising:

means for assigning a top-up of number of latency sensitive (LS) tokens associated with each requestor, with the number of LS tokens indicating the LS bandwidth of the bus allocated to an associated requestor;

means for assigning a top-up of number of latency insensitive (LI) tokens associated with each requestor, with the number of LI tokens indicating the LI bandwidth of the bus allocated to an associated requestor;

means for setting the widths of alternately occurring LS and LI resource access windows with the width of the LI resource access window not greater than a required LS time interval where the width of the LS resource access window is an allocation of total bus bandwidth to LS accesses and the remaining bus bandwidth is allocated to LI accesses;

means for applying either an LS resource access window or an LI resource access window to a current arbitration cycle;

means for granting access to a requestor having the most LS tokens when a number of requestors request access to the bus during a current arbitration cycle in the LS resource access window and decrementing the number of LS tokens assigned to a winning requestor granted access to the bus in proportion to the number of successful bus data transactions completed during the current arbitration cycle; and means for granting access to a requestor having the most LI tokens when a number of requestors request access to the bus during a current arbitration cycle in the LI resource access window and decrementing the number of LI tokens assigned to a winning requestor granted access to the bus in proportion to the number of successful bus data transactions completed during the current arbitration cycle.

13. The system of claim 12 further comprising:

means for reloading all LS and LI token values of devices to the top-up values if the token numbers assigned to all the devices equal zero.

14. The system of claim 12 further comprising:

means for reloading all LS and LI token values of devices to the top-up numbers if the token numbers assigned to all the requestors requesting access to the bus during a current arbitration cycle equal zero.

15. The system of claim 12 further comprising:

means for reloading all LS and LI token values of devices to the top-up numbers if a set time interval expires.

16. The system of claim 12 where the means for setting the time interval widths comprises:

means for setting a counter with an LI interval value to indicate a frequency of latency cycles determined by the LI interval value.

17. The system of claim 12 further comprising:

means for not granting the bus to a particular requestor during a current arbitration cycle if the particular requestor won an immediately preceding arbitration cycle.

18. The system of claim 12 further comprising:

means for monitoring bus protocol timing signals to determine the number of successful bus data transactions completed during the current arbitration cycle.

19. Software embodied on one or more computer readable media when executed operable to:

assign a top-up of number of latency sensitive (LS) tokens associated with each requestor, with the number of LS tokens indicating the LS bandwidth of the bus allocated to an associated requestor;

assign a top-up of number of latency insensitive (LI) tokens associated with each requestor, with the number of LI tokens indicating the LI bandwidth of the bus allocated to an associated requestor;

set the widths of alternately occurring LS and LI access resource windows with the width of the LI resource access window not greater than a required LS time interval, where the width of the LS resource access window is an allocation of total bus bandwidth to LS accesses and the remaining bus bandwidth is allocated to LI accesses;

apply either an LS resource access window or an LI resource access window to a current arbitration cycle;

grant access to a requestor having the most LS tokens when a number of requestors request access to the bus during a current arbitration cycle in the LS resource access window and decrement the number of LS tokens assigned to a winning requestor granted access to the bus in proportion to the number of successful bus data transactions completed during the current arbitration cycle; and grant access to a requestor having the most LI tokens when a number of requestors request access to the bus during a current arbitration cycle in the LI resource access window and decrement the number of LI tokens assigned to a winning requestor granted access to the bus in proportion to the number of successful bus data transactions completed during the current arbitration cycle.

20. The software of claim 19 when executed further operable to:

reload all LS and LI token values of devices to the top-up values if the token numbers assigned to all the devices equal zero.

21. The software of claim 19 when executed further operable to:

reload all LS and LI token values of devices to the top-up numbers if the token numbers assigned to all the requestors requesting access to the bus during a current arbitration cycle equal zero.

22. The software of claim 19 when executed further operable to:

reload all LS and LI token values of devices to the top-up numbers if a set time interval expires.

23. The software of claim 19 operable to set the time interval widths when executed further operable to:

set a counter with an LI interval value to indicate a frequency of latency cycles determined by the LI interval value.

24. The software of claim 19 further operable to:

not grant the bus to a particular requestor during a current arbitration cycle if the particular requestor won an immediately preceding arbitration cycle.

25. The software of claim 19 further operable to:

monitor bus protocol timing signals to determine the number of successful bus data transactions completed during the current arbitration cycle.

* * * * *